United States Patent
Kim et al.

(10) Patent No.: US 9,003,368 B2
(45) Date of Patent: Apr. 7, 2015

(54) PROGRAM FOR TEST CASE GENERATION BASED ON USE CASE DIAGRAM AND METHOD FOR TEST CASE GENERATION USING THE SAME

(75) Inventors: Wooyeol Kim, Gyeonggi-do (KR); Hyunseung Son, Chungcheongnam-do (KR); Robertyoungchul Kim, Gyeonggi-do (KR); Suchun Jin, Daejeon (KR)

(73) Assignees: Hongik University Industry-Academic Cooperation Foundation (KR); Hanback Electronics Co., Ltd (KR)

( * ) Notice: Subject to any disclaimer, the term of this patent is extended or adjusted under 35 U.S.C. 154(b) by 1048 days.

(21) Appl. No.: 13/072,670

(22) Filed: Mar. 25, 2011

(65) Prior Publication Data
US 2012/0101977 A1    Apr. 26, 2012

(30) Foreign Application Priority Data
Oct. 20, 2010   (KR) .......................... 10-2010-102376

(51) Int. Cl.
*G06F 9/44* (2006.01)
*G06N 5/04* (2006.01)
*G06F 11/36* (2006.01)

(52) U.S. Cl.
CPC .............. *G06N 5/04* (2013.01); *G06F 11/3684* (2013.01)

(58) Field of Classification Search
CPC .................................................... G06F 11/3684
USPC .......................................................... 717/124
See application file for complete search history.

(56) References Cited

PUBLICATIONS

Wikipedia, "Adjacency Matrix", Sep. 2005, https://web.archive.org/web/20050901032611/http://en.wikipedia.org/wiki/Adjacency_matrix.*
Jim Heumann, "Generating Test Cases from Use Cases", 2001.*

* cited by examiner

*Primary Examiner* — Wei Zhen
*Assistant Examiner* — Lanny Ung
(74) *Attorney, Agent, or Firm* — Cantor Colburn LLP (57) ABSTRACT

In the program for generating a test case based on a use case diagram and the method for generating a test case using the same according to exemplary embodiments of the present invention, since a use case specification specifying a procedure or method scenario performed in a use case diagram is used to complement insufficient information of a use case diagram used to extract a test case, a layer, although he is not a specialist or an expert, can easily generate a certain level of a test case to effectively perform a test. Thus, requirements can be verified in advance by generating a test case from a use case program, reducing the costs for a system development.

16 Claims, 10 Drawing Sheets

| Basic | Use case Name | Patrol |
|---|---|---|
| | Actor | Patrol commander |
| | Summary | It patrols within a range input by a user. |
| Condition | Pre-Condition | Robot is initialized. It is assumed that a start location of the robot is (0,0) and the robot points to at 90 angles. |
| | Post-Condition | Robot is stopped at a location intended by the user |
| Description | Flow of Events | <1> When the user inputs a target location of patrol by using a graphical user interface and commands a system to start, this use case starts.<br><2> The system stores a start location and the target location, changes its direction toward the target location, and issues a start command to a wheel actuator.<br><3> When there is no stop command, the system repeats the following process at every 10 ms.<br><3.1> The system reads a sensor value to check an intruder<br><3.2> The system recognizes a current location to check whether it has reached a destination<br><3.3> When the system has not reached the destination, it continues to perform the process <3><br><4> When the system reaches the destination, it issues a stop command to the wheel actuator and returns to the process <2>.<br>* When a user stop command [A2] is input with respect to every basic flow, it braches to A2. |
| | Alternatives | <A1. An intruder is detected<br><A1.1> When an intruder is detected, the system issues a stop command to the wheel actuator<br><A1.2> The system makes alarm by using a speaker and the use case is terminated<br><A2> User stop command<br><A2.1> When the user issues the stop command, the system issues a stop command to the wheel actuator and the user case is terminated. |

Fig. 3

Identify Decision Factor

Select Use Case: Patrol

World List:

| Num | Word |
|---|---|
| 1 | User |
| 2 | Graphical |
| 3 | User |
| 4 | Interface and |
| 5 | by using |
| 6 | of a patrol |
| 7 | destination |
| 8 | input |
| 9 | system |
| 10 | to start |
| 11 | commands |
| 12 | this |
| 13 | use case |
| 14 | starts. |
| 15 | system |
| 16 | patrol |
| 17 | start location |
| 18 | destination |
| 19 | stores |
| 20 | toward the destination |
| 21 | its direction |
| 22 | changes |
| 23 | system |
| 24 | wheel |
| 25 | actuator |
| 26 | start command |
| 27 | issues |
| 28 | system |
| 29 | special |

Input:

| Num | Word |
|---|---|
| 1 | Interface and |
| 2 | destination |
| 3 | to start |
| 4 | by using |

Condition:

| Num | Word |
|---|---|
| 1 | I1 and I2 equal... |
| 2 | stores |

Output:

| Num | Word |
|---|---|
| 1 | Wheel |
| 2 | destination |
| 3 | issues |

[OK] [Cancel]

Fig. 4

| No | Post condition | Test condition | Expectation result |
|---|---|---|---|
| TC 1 | I1-Use of Graphical User Interface=F, I2-Input of target location=F, I3-Command to start | and | O1- start use case=F |
| TC 2 | I1-Use of Graphical User Interface=F, I2-Input of target location=F, I3-Command to start | and | O1- start use case=F |
| TC 3 | I1-Use of Graphical User Interface=F, I2-Input of target location=F, I3-Command to start | and | O1- start use case=F |
| TC 4 | I1-Use of Graphical User Interface=F, I2-Input of target location=F, I3-Command to start | and | O1- start use case=F |
| TC 5 | I1-Use of Graphical User Interface=F, I2-Input of target location=F, I3-Command to start | and | O1- start use case=F |
| TC 6 | I1-Use of Graphical User Interface=F, I2-Input of target location=F, I3-Command to start | and | O1- start use case=F |
| TC 7 | I1-Use of Graphical User Interface=F, I2-Input of target location=F, I3-Command to start | and | O1- start use case=F |
| TC 8 | I1-Use of Graphical User Interface=F, I2-Input of target location=F, I3-Command to start | and | O1- start use case=F |
| TC 9 | I4-Store start location of patrol=F, I5- Store target location of patrol=F, I6- Change direction to target location =F | and | O2-Issue start command to wheel actuator=F |
| TC 10 | I4-Store start location of patrol=F, I5- Store target location of patrol=F, I6- Change direction to target location =F | and | O2-Issue start command to wheel actuator=F |
| TC 11 | I4-Store start location of patrol=F, I5- Store target location of patrol=F, I6- Change direction to target location =F | and | O2-Issue start command to wheel actuator=F |

| | 1 | 2 | 3 | 4 | 5 | 6 | 7 | 8 | 9 | 10 | 11 | 12 | 13 | 14 | 15 | 16 | 17 | 18 | 19 |
|---|---|---|---|---|---|---|---|---|---|---|---|---|---|---|---|---|---|---|---|
| Causes | | | | | | | | | | | | | | | | | | | |
| I1- Use Graphical User Interface | F | T | F | T | F | F | F | T | | | | | | | | | | | |
| I2- Input target location | F | F | T | T | F | F | T | T | | | | | | | | | | | |
| I3- Command to start | F | F | F | F | T | T | T | T | | | | | | | | | | | |
| I4- Store start location of patrol | | | | | | | | | F | T | F | T | F | T | F | T | | | |
| I5- Store start location of patrol | | | | | | | | | F | F | T | T | F | F | T | T | | | |
| I6- Chang direction to target location | | | | | | | | | F | F | F | F | T | T | T | T | | | |
| I7- Road sensor value | | | | | | | | | | | | | | | | | F | T | |
| I8- Recognize current location | | | | | | | | | | | | | | | | | | | |
| I9- Check whether destination has reached | | | | | | | | | | | | | | | | | F | T | F |
| I10- Destination has reached | | | | | | | | | | | | | | | | | | | |
| I11- User stop command is received | | | | | | | | | | | | | | | | | | | |
| Effects | | | | | | | | | | | | | | | | | | | |
| O1- Start use case | F | F | F | F | F | F | F | T | | | | | | | | | | | |
| O2- Issue start command to wheel actuator | | | | | | | | | F | F | F | F | F | F | F | T | | | |
| O3- Check intruder | | | | | | | | | | | | | | | | | F | T | F |
| O4- Check whether destination has reached | | | | | | | | | | | | | | | | | | | |
| O5- Perform I7 | | | | | | | | | | | | | | | | | | | |
| O6- Issue stop command to wheel actuator and then.. | | | | | | | | | | | | | | | | | | | |
| O7- Branch to A2 | | | | | | | | | | | | | | | | | | | |

Fig. 10

PROGRAM FOR TEST CASE GENERATION BASED ON USE CASE DIAGRAM AND METHOD FOR TEST CASE GENERATION USING THE SAME

The patent application claims the priority under 35 U.S.C. §119 of Korean Patent Application No. 10-2010-102376, filed on Oct. 20, 2010, the disclosure of which is incorporated by reference herein in its entirety.

BACKGROUND OF THE INVENTION

1. Field of the Invention

The present invention relates to a program for generating a test case based on a use case diagram and a method for generating a test case using the same and, more particularly, to a use case diagram-based test case generating program capable of generating a test case by using a use case specification in which a procedure or method scenario in a use case diagram are specified, and a method for generating a test case by using the same.

2. Related Art

A use case diagram expresses functions (behaviors or actions) viewed from the exterior.

Namely, the use case diagram allows for a user to know about (or recognize) which functions a system has when the system is viewed from the outside (i.e., viewed by the user). The use case diagram is used at a level of an upper operation such as a request analysis, or the like, and used to clarify a development target by organizing a request (i.e., a function request) from a user's 'this function is required'.

Main elements of the use case diagram include an actor and a use case. The actor is an entity existing outside a certain system. In general, the actor refers to a user of the system or a relevant external system. The actor is denoted as an icon having a shape of a human being, and called a 'stick man'. When actors are expressed to be abstractive or embodied, the actors can be expressed in the generalization relationship, which is denoted as a solid line having hollow triangles. The meaning of the generalization relationship is similar to an object-oriented inheritance, and every function of a generalized actor is owned by a specialized actor. A user case represents the function of a certain system when the system is viewed from the outside. Thus, internal processing, or the like, of a level which cannot be recognized from the outside is expressed as a diagram, rather than being expressed as a use case. A use case is denoted in an oval shape, and a name is described in the oval. When a certain function includes a different function, it is expressed by using the inclusion relationship between use cases. Also, when a function (processing) is added by extending a certain function, it is expressed by using the extension relationship between use cases.

In the related art use case diagram, a test specialist directly identifies elements corresponding to a test and manually creates a test case based on the identified elements. Thus, since the test case is manually created, the quality of the created test case is determined by the level of the specialist. If the test case is created by a layman, much time will be taken to generate the test case and the quality of the test case would be degraded. As a result, because all the tasks must be manually performed, the efficiency deteriorates to degrade productivity.

SUMMARY OF THE INVENTION

It is, therefore, an object of the present invention to provide a use case diagram-based test case generating program capable of sequentially displaying the process of generating a test case from a use case diagram and automating the test case generation process, by using a use case specification in which a procedure or method scenario of a function is specified in a use diagram, to thus allow a layman to easily generate a certain level of a test case, and a method for generating a test case by using the same.

To achieve the above object, there is provided a program for generating a test case based on a use case diagram, including: a use case specification configured to generate a procedure or method scenario performed in a use case diagram; a test determination element extraction unit configured to separate the scenario specified in the use case specification according to the meaning of words to extract test determination elements; a cause result graph generation unit configured to express the determination elements, which have been extracted by the test determination element extraction unit, by logical expressions to configure the relationships between the determination elements and express the configured relationships through a graph; a determination table generation unit configured to select the coverage of the graph, which has been expressed by the cause result graph generation unit, to generate a table; and a test case generation unit configured to generate a test case by using the table which has been generated by the determination table generation unit.

The use case specification may be created upon being classified by Basic including Use case Name for describing the name of a current use case, Actor for describing the user of the use case, and Summary for describing the summary of the use case, Condition including Pre-condition for discriminating past conditions and Post-Condition for describing current conditions, and Description including Flow of Events for describing the flow of events and Alternatives for describing alternative methods.

The test determination element extraction unit may include: a list generation unit configured to generate a word list by analyzing the sentences of the use case specification; and a word classification unit configured to classify words by Input, Condition, and Output Types by using the word list generated by the list generation unit.

The cause result graph generation unit may include: an element disposition unit configured to obtain the number of determination elements, extracted by the test determination element extraction unit, by Type and repeated by the number to dispose the determination elements by Input Type, Condition Type, and Output Type; and a graph generation unit configured to generate a graph by connecting the relationships between the determination elements disposed by the element disposition unit.

The test case generation unit may generate a test case classified by No of the generated test cases, Post Condition for creating a sentence by connecting an input values and a truth value of the table generated by the determination table generation unit, Test Condition for expressing the relationship between an input condition and an output value, and Expectation Result for expressing a result value expected when the post condition value is input.

To achieve the above object, there is also provided a method for generating a test case based on a use case diagram, including: checking whether or not a procedure or method scenario performing in a use case diagram is specified in a use case specification; separating, by a test determination element extraction unit, a scenario specified in the use case specification according to the meaning of words to extract test determination elements; expressing the determination elements, which have been extracted by the test determination element extraction unit, by logical expressions to configure the relationships between the determination elements, and expressing the configured relationships through a graph; selecting, by a determination table generation unit, the coverage of the graph expressed by the cause result graph generation unit to generate a table; and generating, by a test case generation unit, a test case by using the table generated by the determination table generation unit.

In separating, by the test determination element extraction unit, a scenario specified in the use case specification according to the meaning of words to extract test determination elements, words may be classified by Input, Condition, and Output Types by a list generation unit which generates a word list through a sentence analysis of the use case specification.

In establishing, by the cause result graph generation unit, the relationships between the determination elements extracted by the test determination element extraction unit by expressing them by logical expressions, and expressing the established relationships through a graph, the number of determination elements, extracted by the test determination element extraction unit, may be obtained by type and the number may be repeated to dispose the determination elements by Input Type, Condition Type, and Output Type, and a graph may be generated by connecting the relationships between the determination elements disposed by the element disposition unit.

In expressing the graph, the condition type elements may be interpreted to separate the elements into four types of logic expressions of Equal, NOT, AND, and OR to thus extract Input Type elements, the Input Type elements may be connected to the Condition Type elements, and the Condition Type elements and the Output Type elements may be connected to thus express a graph.

In selecting, by the determination table generation unit, the coverage of the graph expressed by the cause result graph generation unit to generate a table, N values input in the graph are converted into binary values, the converted binary values may be converted into True or False values, the converted values may be written in the Input Type, and the respective values may be calculated by using logical expressions and then written in the Output Type to thus generate a table.

In the program for generating a test case based on a use case diagram and the method for generating a test case using the same according to exemplary embodiments of the present invention, since a use case specification specifying a procedure or method scenario performed in a use case diagram is used to complement insufficient information of a use case diagram used to extract a test case, a layer, although he is not a specialist or an expert, can easily generate a certain level of a test case to effectively perform a test.

In addition, since requirements can be verified in advance by generating a test case from a use case program, the costs for a system development can be reduced.

BRIEF DESCRIPTION OF THE DRAWINGS

The above and other objects and features of the present invention will become apparent from the following description of preferred embodiments given in conjunction with the accompanying drawings, in which:

FIG. 3 is a view illustrating a use case specification employed in the program for generating a test case according to an exemplary embodiment of the present invention.

FIG. 5 is a view illustrating a test case generation unit employed in the program for generating a test case according to an exemplary embodiment of the present invention.

DETAILED DESCRIPTION OF THE EMBODIMENTS

The foregoing and other objects, features, aspects and advantages of the program for generating a test case based on a use case diagram and a method for generating a test by using the same according to exemplary embodiments of the present invention will become more apparent from the following detailed description of the present invention when taken in conjunction with the accompanying drawings.

Program for Generating Test Case Based on Use Case Diagram

With reference to FIGS. 1 to 5, a test case generation program 100 based on a use case diagram according to an exemplary embodiment of the present invention may be configured to include a use case specification 110 specifying a procedure or method scenario performed in a use case diagram, a test determination element extraction unit 120 separating the scenario specified in the use case specification 110 according to the meaning of words to extract test determination elements, a cause result graph generation unit 130 expressing the determination elements, which have been extracted by the test determination element extraction unit 120, by logical expressions to configure the relationships between the determination elements and expressing the configured relationships through a graph, a determination table generation unit 140 selecting the coverage of the graph, which has been expressed by the cause result graph generation unit 130, to generate a table, and a test case generation unit 150 generating a test case by using the table which has been generated by the determination table generation unit 140.

The use case diagram according to the present exemplary embodiment is a means for expressing functions provided by a system and relevant external elements from a user's point of view, which is largely used to define requirements in software development.

Figure 2:
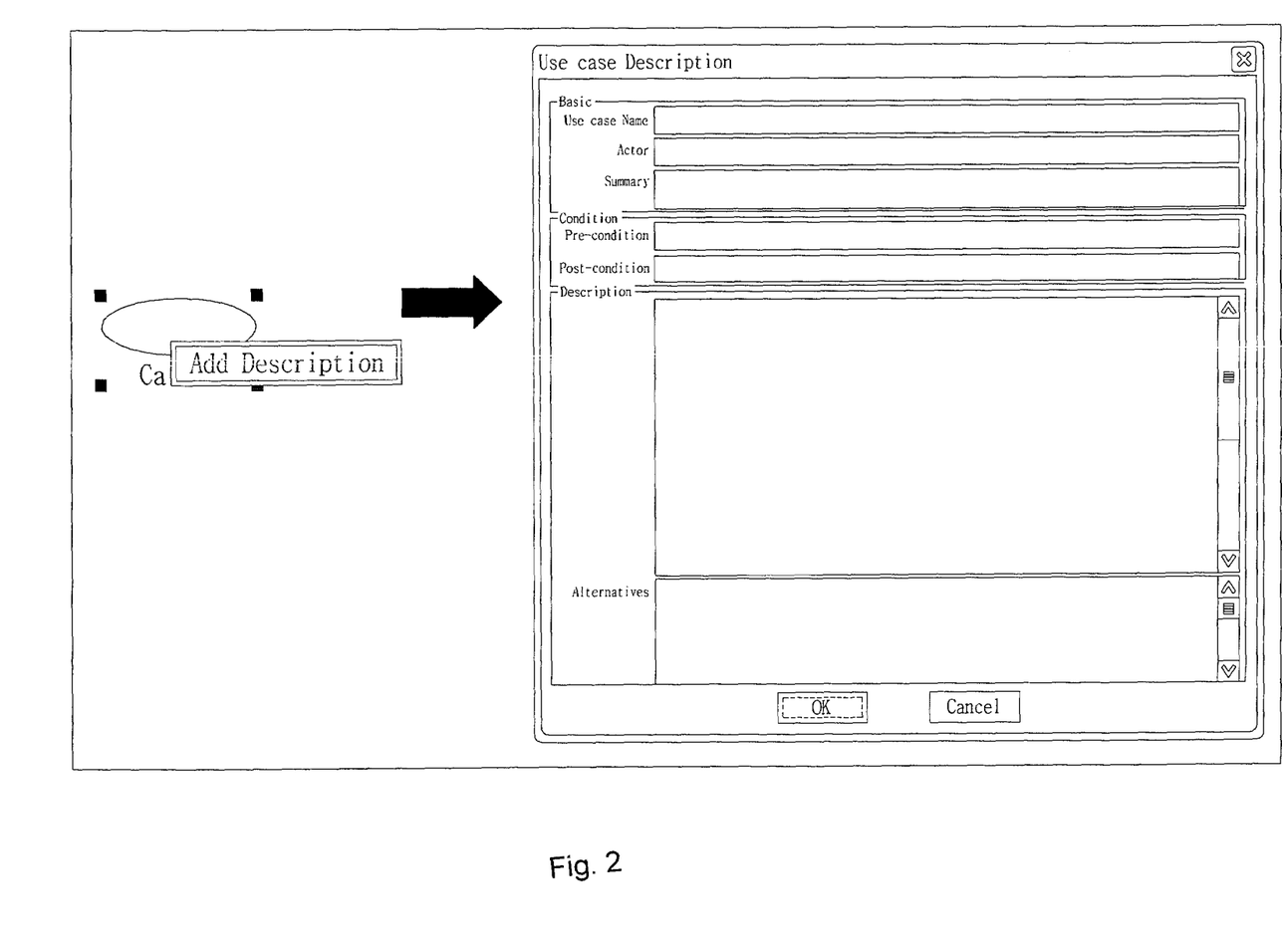
FIG. 2 is a view illustrating a gauge of a use case specification employed in the program for generating a test case according to an exemplary embodiment of the present invention.

The use case specification 110 may specify a procedure or method scenario performed in a use case diagram. As shown in FIGS. 2 and 3, the use case specification 110 may be created upon being classified by Basic including Use Case Name for describing the name of a current use case, Actor for describing the user of the use case, and Summary for describing the summary of the use case, Condition including Pre-condition for discriminating past conditions and Post-Condition for describing current conditions, and Description including Flow of Events for describing the flow of events and Alternatives for describing alternative methods. This is merely illustrative for the sake of brevity and the present invention is not meant to be limited thereto.

In this case, the Description part of the use case specification 110 is determination element candidate groups for performing testing. In order to classify words in the Description, scenario numbers, excluding words, needs to be eliminated. The scenario elimination method can be easily resolved by using special symbols '<' and '>'. Namely, a mark is attached to the number, like '<1>' to allow a computer device to easily recognize and eliminate it in classifying words.

Figure 1:
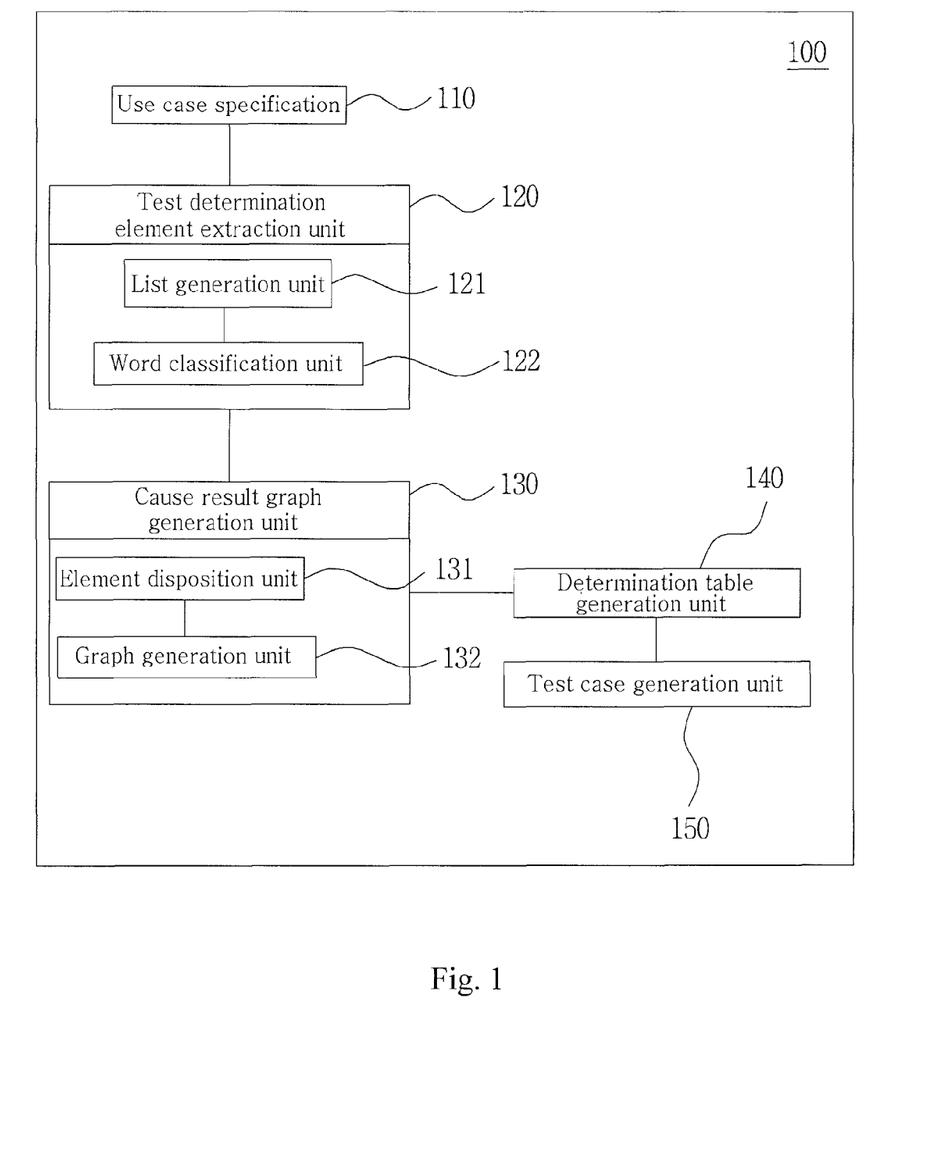
FIG. 1 is a schematic block diagram of a program for generating a test case based on a use case diagram according to an exemplary embodiment of the present invention.

The test determination element extraction unit 120 can separate the scenario specified in the use case specification 110 according to the meaning of words to extract test determination elements. The test determination element extraction unit 120 includes a list generation unit 121 and a word classification unit 122. The list generation unit 121 generates a word list 121a by analyzing sentences of the use case specification 110, and the word classification unit 122 can classify words by types of Input 122a, Condition 122b, and Output 122c by using the word list 121a generated by the list generation unit 121.

Figure 4:
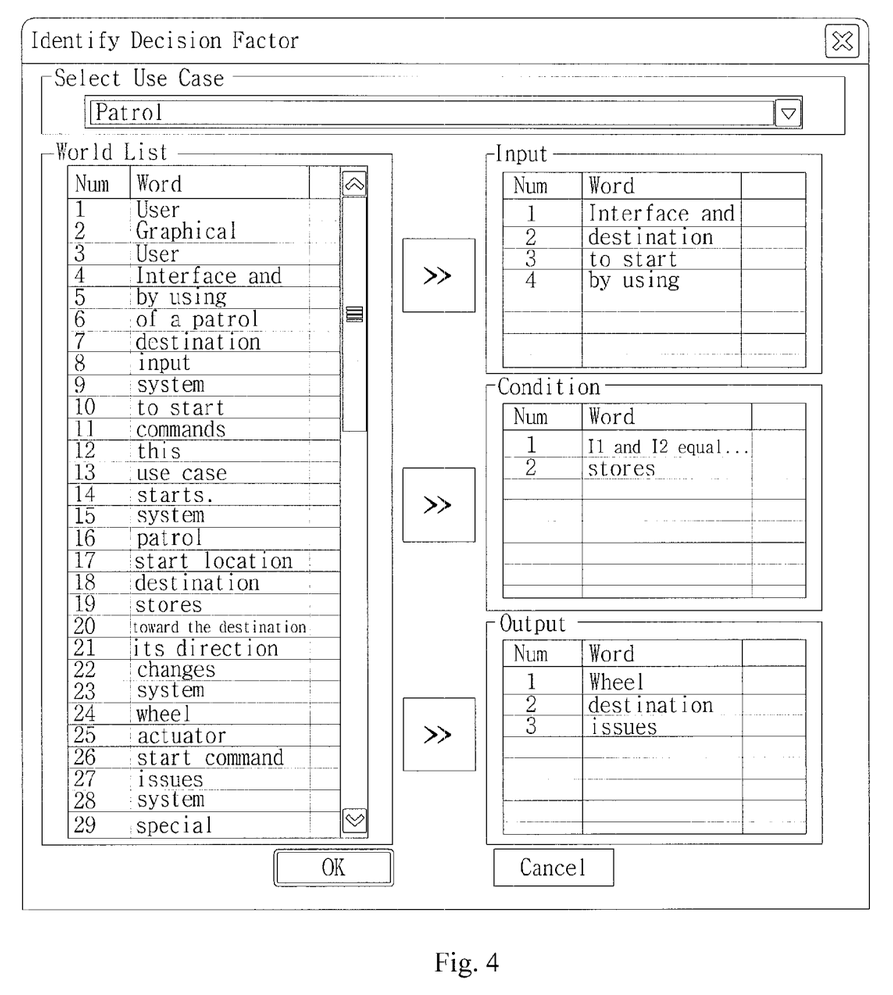
FIG. 4 is a view illustrating a test determination element extraction unit employed in the program for generating a test case according to an exemplary embodiment of the present invention.

Namely, the test determination element extraction unit 120 first makes the word list 121a by analyzing the sentences of the Description of the use case specification 110. The process of generating the word list 121a has been described above. The test determination element extraction unit 120 classifies into Input 122a, Condition 122b, and Output 122c by using the word list 121a, thus performing the classification operation as shown in FIG. 4. Elements of the thusly classified Input 122a, Condition 122b, and Output 122c greatly affects a test case to be generated afterwards.

Table 1 below shows test determination elements according to FIG. 4. List Num refers to sequence of the respective types. A first input is denoted as 'I1', a second input is denoted as 'I2', outputs are denoted as 'O1, O2, O3, . . . , ', and conditions are denoted as 'C1, C2, C3, . . . '. Value indicates values corresponding to the respective types. Generated basically in the determination element identifying process are identified words, lacking information. Thus, a sentence is completed based on the words in this process. The Condition 122b expresses elements connecting the Input 122a and Output 122c. In this case, AND(&), OR(|), and NOT(~) are used for logical expressions. For example, when I1 & I2=O1, it expresses that O1 becomes true when both conditions of I1 and I2 are satisfied.

TABLE 1

| List Num | Value | Type |
| --- | --- | --- |
| I1 | Input target location | Input |
| I2 | Command to start | Input |
| O1 | Perform user stop command | Output |
| O1 | I1 & I2 = O1 | Condition |

Type indicates the type of a determination element, and in this case, the type includes the three types: Input 122a, Condition 122b, and Output 122c.

The cause result graph generation unit 130 expresses the determination elements, which have been extracted by the test determination element extraction unit 120, by logical expressions to configure the relationships between the determination elements, and may express the same through a graph. The cause result graph generation unit 130 includes an element disposition unit 131 and a graph generation unit 132. The element disposition unit 131 obtains the number of the determination elements of the respective types extracted by the test determination element extraction unit 120 and disposes the determination elements according to the Input 122a Type, Condition 122B type, Output 122c Type, and the graph generation unit 132 may generate a graph by connecting the relationships between the determination elements disposed by the element disposition unit 131.

Namely, the cause result graph generation unit 130 obtains the number of each of items of the data of Input 122a, Condition 122b, and Output 122c identifying the determination elements, and repeats the respective numbers to perform an Input 122a element disposition, a Condition 122b element disposition, and an Output element disposition. When these element dispositions are performed, boxes (Input 122a and Output 122c) and an oval (Condition 122b) are continuously drawn on the screen. When the dispositions of the elements are completed, a graph connecting the relationships between the elements is drawn. In this case, logical expressions of the Condition 122b are used. The Condition 122b describing the logical expressions is interpreted to be separated into four states: Equal, NOT, AND, and OR. In the case of Equal, a blank mark is inserted to separate the logical expression. In the case of NOT, a mark '~' is inserted to separate the logical expression. In the case of AND, a mark 'A' is inserted to separate the logical expression. In the case of OR, a mark '0' is inserted to separate the logical expression. Thereafter, the logical expressions (AND, OR, NOT, and Equal) are discriminated to extract the Input 122a element and connect the same to the Condition 122b. And then, a symbol '=' is separated to connect the Condition 122b and the Output 122c elements. Through this process, the foregoing determination elements can be converted into a graph.

The following shows an example of a graph conversion with respect to the respective conditional expressions. When the Condition 122b is C1 and I1=O1, the graph may be expressed as follows.

When the Condition 122b is C1 and ~I1=O1, the graph may be expressed as follows.

When the Condition 122b is C1 and I1 & I2=O1, the graph may be expressed as follows.

When the Condition 122b is C1 and I1|I2=O1, the graph may be expressed as follows.

The determination table generation unit 140 may generate a table by selecting the coverage of the graph expressed by the cause result graph generation unit 130. The method for converting the cause result graph into a determination table will be described in detail later.

The test case generation unit 150 may generate a test case by using the table which has been generated by the determination table generation unit 140. As shown in FIG. 5, the test case generation unit 150 may generate test cases upon classifying them by Nos. of generated test cases, Post Condition for creating sentences by connecting input values and truth values of the table generated by the determination table generation unit 140, Test Condition for expressing the relationships between input conditions and output values, and Expectation Result for expressing result values expected when the values of Post Condition are input.

Method for Generating Test Case Based on Use Case Diagram

Figure 6:
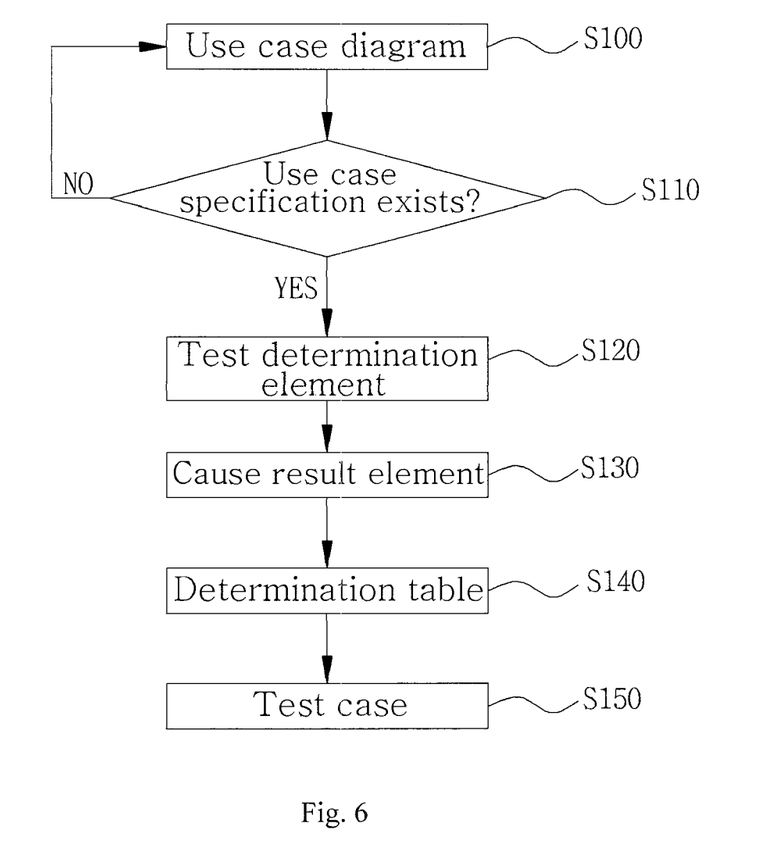
FIG. 6 is a flow chart illustrating the process of a method for generating an overall test case based on a use case diagram according to an exemplary embodiment of the present invention.
Figure 10:
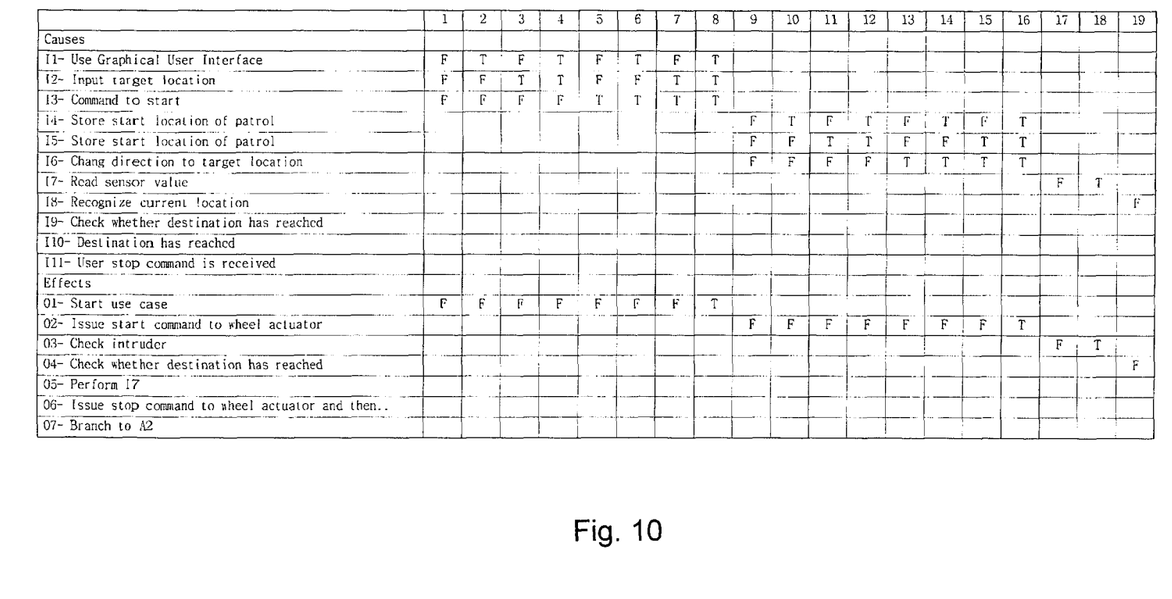
FIG. 10 is a view illustrating a determination table obtained by using a graph employed in the method for generating a test case according to an exemplary embodiment of the present invention.

With reference to FIGS. 6 and 10, a method for generating a test case based on a use case diagram according to an exemplary embodiment of the present invention is a method for generating a test case through the test case generation program 100 based on the foregoing use case diagram configured as illustrated in FIGS. 1 to 5, and a repeated description will be omitted.

First, the use case specification 110 is gauged so as to be put into a use case diagram (S100).

Next, it is checked whether or not a procedure or method scenario performed in the use case diagram is specified in the use case specification 110 (S110).

Figure 7:
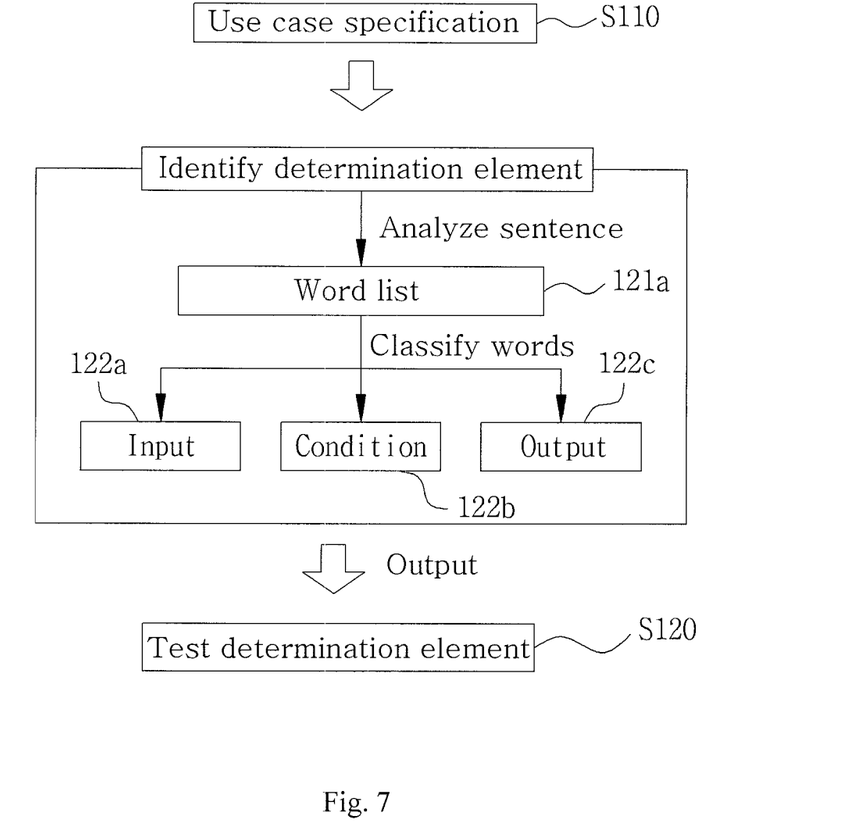
FIG. 7 is a flow chart illustrating the process of extracting test case determination elements employed in the method for generating a test case according to an exemplary embodiment of the present invention.

And then, the scenario specified in the use case specification 110 is separated according to the meaning of words by the test determination element extraction unit 120 to extract test determination elements (S120). As shown in FIG. 7, the test determination element extraction unit 120 makes the word list 121a by analyzing the sentences in the Description of the use case specification 110. The process of making the word list 121a has been described. The test determination elements are classified by Input 122a, Condition 122b, and Output 122c by using the word list 121a. This process may be performed by the list generation unit 121 and the word classification unit 122.

Figure 8:
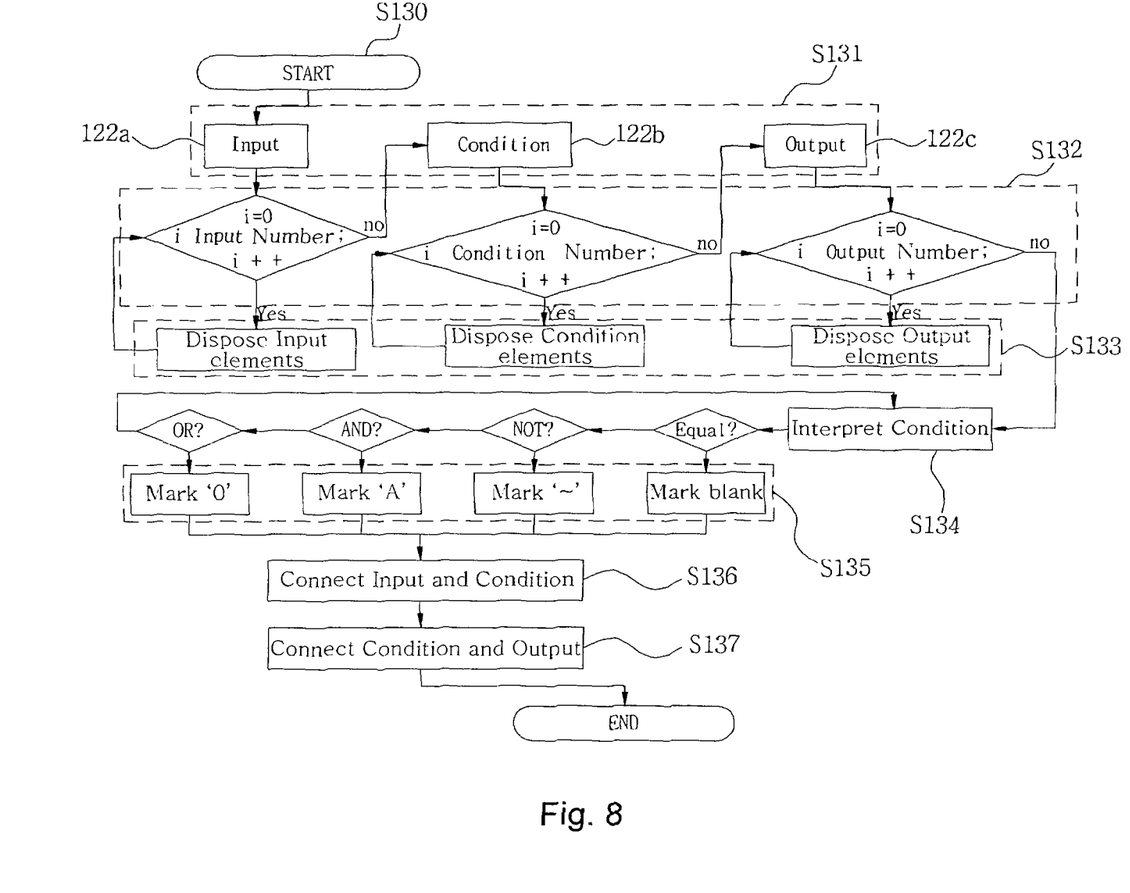
FIG. 8 is a flow chart illustrating the process of expressing a graph employed in the method for generating a test case according to an exemplary embodiment of the present invention.

Thereafter, the determination elements, which have been extracted by the test determination element extraction unit 120, are expressed by logical expressions by the cause result graph generation unit 130 to establish the relationships between the determination elements, and the relationships are expressed through a group (S130). Namely, the number of the determination elements of the respective types extracted by the test determination element extraction unit 120 is obtained, the determination elements are disposed according to the Input 122a Type, Condition 122B type, Output 122c Type, and a graph is generated by connecting the relationships between the determination elements. This operation may be performed by the element disposition unit 131 and the graph generation unit 132. In detail, with reference to FIG. 8, the data of Input 122a, Condition 122b, and Output 122c identifying the determination elements is extracted (S131), the number of items of the data is obtained and then repeated by the respective numbers (S132), and then, an Input 122a element disposition, a Condition 122b element disposition, and an Output element disposition are performed (S133). When these element dispositions are performed, boxes (Input 122a and Output 122c) and an oval (Condition 122b) are continuously drawn on the screen. When the dispositions of the elements are completed, a graph connecting the relationships between the elements is drawn. In this case, logical expressions of the Condition 122b are used. The Condition 122b describing the logical expressions is interpreted (S134) to be separated into four states: Equal, NOT, AND, and OR. In the case of Equal, a blank mark 308 is inserted to separate the logical expressions. In the case of NOT, a mark 309 '~' is inserted to separate the logical expression. In the case of AND, a mark 310 'A' is inserted to separate the logical expression (S135). In the case of OR, a mark 311 '0' is inserted to separate the logical expression. Thereafter, the logical expressions (AND, OR, NOT, and Equal) are discriminated to extract the Input 122a element and connect the same to the Condition 122b (S136). And then, a symbol is separated to connect the Condition 122b and the Output 122c elements (S137). Through this process, the foregoing determination elements can be converted into a graph.

Figure 9:
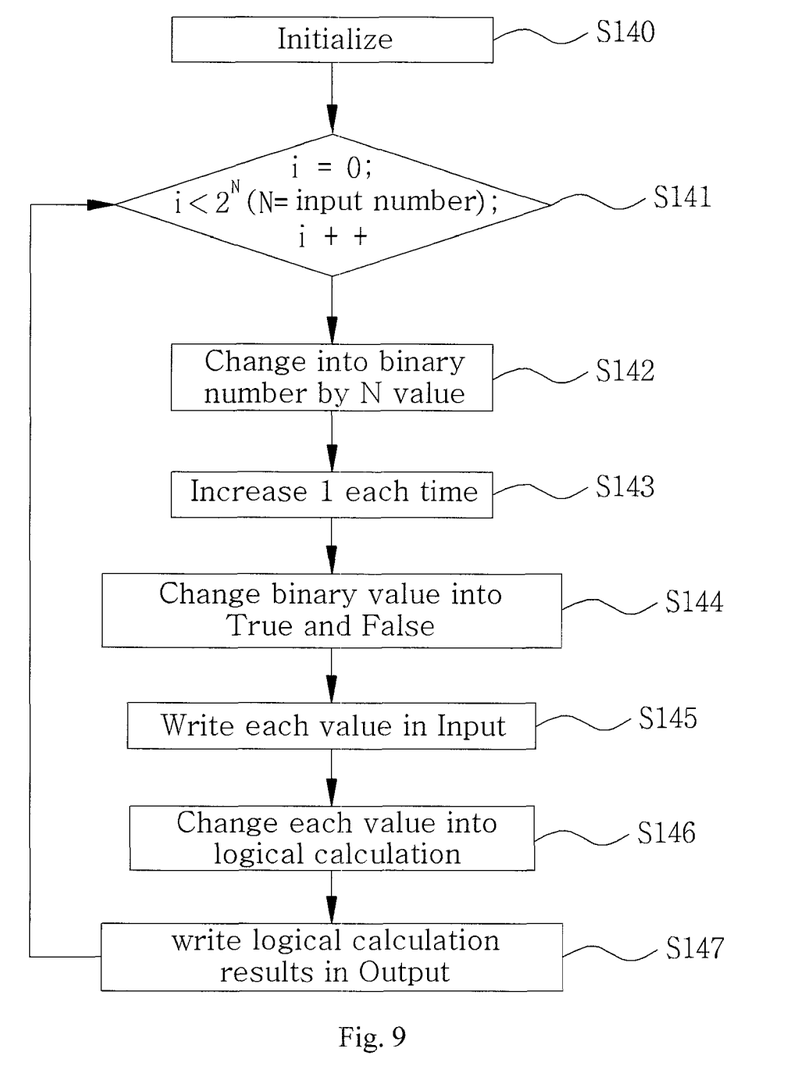
FIG. 9 is a flow chart illustrating the process of generating a table employed in the method for generating a test case according to an exemplary embodiment of the present invention.

Thereafter, the coverage of the graph expressed by the cause result graph generation unit 130 is selected by the determination table generation unit 140 to generate a table (S140). Namely, N values input in the graph are converted into binary values, the binary values are converted into True and False values, the converted values are written in the Input 122a Type, and then the respective values are calculated by using logical expressions to generate a table. In detail, with reference to FIGS. 9 and 10, parts having the input and result relationships in the cause result graph are calculated as full combination. Namely, calculation is performed in consideration of all the combinations and then output (S141). Thus, 2N of the input number N is calculated. It is converted into a binary value corresponding to an input N value (S142). For example, when N is 3, it is converted into 000, and when N is 4, it is converted into 0000. These initial values are increased by 1 each time to 001 or 0001 (S143). For example, when N is 3 and continuously increased, it is increased to 000, 001, 010, 011, 100, 101, 110, and 111. The thusly increased binary values are converted into True and False (S144). 0 is changed into false and 1 is changed into true. When N is 3 and the respective values are converted, it becomes FFF, FFT, FTF, and FTT. The converted values are written in the Input 122a (S145). In the case of FFF, I1=F, I2=F, and I3=F are input. The respective values are logically calculated (S146). Namely, the respective values are calculated by logical expressions (Equal, NOT, AND, OR). For example, when the value is FFT and the logical expression is AND, the result is F. This logical calculation value is written in the Output (S147) to obtain a result. The front F is input to a corresponding On. FIG. 10 shows a determination table obtained by using the graph.

Thereafter, a test case is generated by the test case generation unit 150 by using the table which has been generated by the determination table generation unit 140 (S150). The generated test case is as described above with reference to FIG. 5. Constituents of the test case include No. Post Condition, Test Condition, and Expectation Result. No is the number of test cases which are enumerated as TC1, TC2, TC3, . . . TCn. Post Condition is input values of the determination table, which creates a sentence by connecting the respective input values I1, I2, I3, . . . , In and truth values (True, False). Test Condition expresses the relationship between input conditions and output values. Expectation result expresses a result value expected when the value of Post Condition is input.

As described above, in the program for generating a test case based on a use case diagram and the method for generating a test case using the same according to exemplary embodiments of the present invention, since a use case specification specifying a procedure or method scenario performed in a use case diagram is used to complement insufficient information of a use case diagram used to extract a test case, a layer, although he is not a specialist or an expert, can easily generate a certain level of a test case to effectively perform a test. Thus, requirements can be verified in advance by generating a test case from a use case program, reducing the costs for a system development.

As the present invention may be embodied in several forms without departing from the characteristics thereof, it should also be understood that the above-described embodiments are not limited by any of the details of the foregoing description, unless otherwise specified, but rather should be construed broadly within its scope as defined in the appended claims, and therefore all changes and modifications that fall within the metes and bounds of the claims, or equivalents of such metes and bounds are therefore intended to be embraced by the appended claims.

What is claimed is:

1. A non-transitory computer readable medium storing a program that, when executed by a computer, causes the computer to generate a test case based on a use case diagram, the program comprising:
   a use case specification configured to generate a procedure or method scenario performed in a use case diagram;
   a test determination element extraction unit configured to separate a plurality of words of the scenario specified in the use case specification into input words, condition words, and output words according to the meaning of words to extract test determination elements;
   a cause result graph generation unit configured to express the determination elements, which have been extracted by the test determination element extraction unit, by logical expressions to configure the relationships between the determination elements and express the configured relationships through a graph;
   a determination table generation unit configured to select the coverage of the graph, which has been expressed by the cause result graph generation unit, to generate a table; and
   a test case generation unit configured to generate a test case by using the table which has been generated by the determination table generation unit.

2. The computer readable medium of claim 1, wherein the use case specification is created upon being classified by Basic including Use case Name for describing the name of a current use case, Actor for describing the user of the use case, and Summary for describing the summary of the use case, Condition including Pre-condition for discriminating past conditions and Post-Condition for describing current conditions, and Description including Flow of Events for describing the flow of events and Alternatives for describing alternative methods.

3. The computer readable medium of claim 1, wherein the test determination element extraction unit comprises:
   a list generation unit configured to generate a word list by analyzing the sentences of the use case specification; and
   a word classification unit configured to classify words by Input, Condition, and Output types by using the word list generated by the list generation unit.

4. The computer readable medium of claim 3, wherein the cause result graph generation unit comprises:
   an element disposition unit configured to obtain the number of determination elements, extracted by the test determination element extraction unit, by Type and repeated by the number to dispose the determination elements by Input Type, Condition Type, and Output Type; and
   a graph generation unit configured to generate a graph by connecting the relationships between the determination elements disposed by the element disposition unit.

5. The computer readable medium of claim 1, wherein the test case generation unit generates a test case classified by No of the generated test cases, Post Condition for creating a sentence by connecting an input values and a truth value of the table generated by the determination table generation unit, Test Condition for expressing the relationship between an input condition and an output value, and Expectation Result for expressing a result value expected when the post condition value is input.

6. The computer readable medium of claim 1, wherein the graph comprises one or more input nodes connected to an output node via a condition node.

7. A method for generating a test case based on a use case diagram, the method comprising:
   checking whether or not a procedure or method scenario performing in a use case diagram is specified in a use case specification;
   separating, by a test determination element extraction unit, a plurality of words of a scenario specified in the use case specification into input words, condition words and output words according to the meaning of words to extract test determination elements;
   expressing the determination elements, which have been extracted by the test determination element extraction unit, by logical expressions to configure the relationships between the determination elements, and expressing the configured relationships through a graph;
   selecting, by a determination table generation unit, the coverage of the graph expressed a cause result graph generation unit to generate a table comprising different combinations of the determination elements and a test condition for each of the combinations; and generating, by a test case generation unit, a test case by using the table generated by the determination table generation unit.

8. The method of claim 7, wherein, in separating, by the test determination element extraction unit, a scenario specified in the use case specification according to the meaning of words to extract test determination elements, words are classified by Input, Condition, and Output Types by a list generation unit which generates a word list through a sentence analysis of the use case specification.

9. The method of claim 7, wherein, in establishing, by the cause result graph generation unit, the relationships between the determination elements extracted by the test determination element extraction unit by expressing them by logical expressions, and expressing the established relationships through a graph, the number of determination elements, extracted by the test determination element extraction unit, is obtained by type and the number is repeated to dispose the determination elements by Input Type, Condition Type, and Output Type, and a graph is generated by connecting the relationships between the determination elements disposed by the element disposition unit.

10. The method of claim 9, wherein, in expressing the graph, the Condition Type elements are interpreted to separate the elements into four types of logical expressions of Equal, NOT, AND, and OR to thus extract Input Type elements, the Input Type elements are connected to the Condition Type elements, and the Condition Type elements and the Output Type elements are connected to thus express a graph.

11. The method of claim 7, wherein, in selecting, by the determination table generation unit, the coverage of the graph expressed by the cause result graph generation unit to generate a table, N values input in the graph are converted into binary values, the converted binary values are converted into True or False values, the converted values are written in the Input Type, and the respective values are calculated by using logical expression and then written in the Output Type to thus generate a table.

12. The method of claim 7, wherein the graph comprises one or more input nodes connected to an output node via a condition node.

13. A method for generating a test case based on a use case diagram, the method comprising:

checking whether or not a procedure or method scenario performing in a use case diagram is specified in a use case specification;

separating, by a test determination element extraction unit, a scenario specified in the use case specification according to the meaning of words to extract test determination elements;

expressing the determination elements, which have been extracted by the test determination element extraction unit, by logical expressions to configure the relationships between the determination elements, and expressing the configured relationships through a graph;

selecting, by a determination table generation unit, the coverage of the graph expressed by the cause result graph generation unit to generate a table; and generating, by a test case generation unit, a test case by using the table generated by the determination table generation unit, wherein, in establishing, by the cause result graph generation unit, the relationships between the determination elements extracted by the test determination element extraction unit by expressing them by logical expressions, and expressing the established relationships through a graph, the number of determination elements, extracted by the test determination element extraction unit, is obtained by type and the number is repeated to dispose the determination elements by Input Type, Condition Type, and Output Type, and a graph is generated by connecting the relationships between the determination elements disposed by the element disposition unit.

14. The method of claim 13, wherein, in separating, by the test determination element extraction unit, a scenario specified in the use case specification according to the meaning of words to extract test determination elements, words are classified by Input, Condition, and Output Types by a list generation unit which generates a word list through a sentence analysis of the use case specification.

15. The method of claim 13, wherein, in expressing the graph, the Condition Type elements are interpreted to separate the elements into four types of logical expressions of Equal, NOT, AND, and OR to thus extract Input Type elements, the Input Type elements are connected to the Condition Type elements, and the Condition Type elements and the Output Type elements are connected to thus express a graph.

16. The method of claim 13, wherein, in selecting, by the determination table generation unit, the coverage of the graph expressed by the cause result graph generation unit to generate a table, N values input in the graph are converted into binary values, the converted binary values are converted into True or False values, the converted values are written in the Input Type, and the respective values are calculated by using logical expression and then written in the Output Type to thus generate a table.

* * * * *